(12) United States Patent
Shuck et al.

(10) Patent No.: US 11,554,536 B2
(45) Date of Patent: Jan. 17, 2023

(54) FUSED FILAMENT FABRICATION OF SHAPE MEMORY ALLOYS

(71) Applicants: Rolls-Royce Corporation, Indianapolis, IN (US); Rolls-Royce North American Technologies, Inc., Indianapolis, IN (US)

(72) Inventors: Quinlan Yee Shuck, Indianapolis, IN (US); Scott Nelson, Carmel, IN (US); Raymond Ruiwen Xu, Carmel, IN (US); Brandon David Ribic, Noblesville, IN (US); Matthew R. Gold, Carmel, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 1 day.

(21) Appl. No.: 17/098,110

(22) Filed: Nov. 13, 2020

(65) Prior Publication Data

US 2021/0146607 A1  May 20, 2021

Related U.S. Application Data

(60) Provisional application No. 62/935,415, filed on Nov. 14, 2019.

(51) Int. Cl.
*B29C 64/118* (2017.01)
*B33Y 70/00* (2020.01)
(Continued)

(52) U.S. Cl.
CPC .......... *B29C 64/118* (2017.08); *B29C 64/245* (2017.08); *B29C 64/295* (2017.08);
(Continued)

(58) Field of Classification Search
CPC ... B29C 64/118; B29C 64/393; B29C 64/245; B29C 64/295; B33Y 10/00; B33Y 30/00; B33Y 70/00; B33Y 80/00; B33Y 50/02
See application file for complete search history.

(56) References Cited

U.S. PATENT DOCUMENTS

| 5,900,207 A | * | 5/1999 | Danforth ........... C04B 35/63436 |
| | | | 419/36 |
| 10,254,499 B1 | | 4/2019 | Cohen et al. |
| 2019/0160206 A1 | | 5/2019 | Lathers et al. |
| 2020/0164963 A1 | * | 5/2020 | da Silva ................ B64C 23/072 |

FOREIGN PATENT DOCUMENTS

| CN | 105268973 A | 1/2016 | |
| EP | 1770176 A1 * | 4/2007 | ............ B22F 1/0074 |

(Continued)

OTHER PUBLICATIONS

Van Humbeeck, "Additive Manufacturing of Shape Memory Alloys," Shape Memory and Superelasticity, vol. 4, No. 2, Apr. 30, 2018, pp. 309-312.
Andani, "Modeling, Simulation, Additive Manufacturing, and Experimental Evaluation of Solid and Porous NiTi," The University of Toledo, Theses and Dissertations, Aug. 2015, 75 pp.
(Continued)

*Primary Examiner* — Joseph S Del Sole
*Assistant Examiner* — Jamel M Nelson
(74) *Attorney, Agent, or Firm* — Shumaker & Sieffert, P.A.

(57) ABSTRACT

A method may include fused filament fabricating a fused filament fabricated component by delivering a softened filament to selected locations at or adjacent to a build surface. The softened filament may include a sacrificial binder and a powder including a shape memory alloy (SMA). The method also may include removing substantially all the sacrificial binder from the fused filament
(Continued)

fabricated component to leave an unsintered component; and sintering the unsintered component to join particles of the SMA and form an SMA component.

8 Claims, 4 Drawing Sheets

(51) Int. Cl.
*B29C 64/245* (2017.01)
*B29C 64/295* (2017.01)
*B29C 64/393* (2017.01)
*B33Y 10/00* (2015.01)
*B33Y 30/00* (2015.01)
*B33Y 50/02* (2015.01)
*B33Y 80/00* (2015.01)
*B29L 31/08* (2006.01)

(52) U.S. Cl.
CPC ............ *B29C 64/393* (2017.08); *B33Y 70/00* (2014.12); *B29L 2031/08* (2013.01); *B33Y 10/00* (2014.12); *B33Y 30/00* (2014.12); *B33Y 50/02* (2014.12); *B33Y 80/00* (2014.12)

(56) References Cited

FOREIGN PATENT DOCUMENTS

| EP | 1770176 A1 | 4/2007 |
| WO | 2016012486 A1 | 1/2016 |
| WO | 2018117907 A1 | 6/2018 |
| WO | 2019005708 A2 | 1/2019 |
| WO | WO-2019005708 A2 * | 1/2019 ............. A23P 20/20 |

OTHER PUBLICATIONS

Brothers, "NASA Shape Memory Alloys," Aerospace Manufacturing and Design, Dec. 5, 2017, 5 pp.
Response to Extended Search Report dated Mar. 9, 2021, from counterpart European Application No. 20206803.7, filed Nov. 5, 2021, 12 pp.
Oberhofer et al., "Approach to a Design Guideline Regarding the Interaction of Shape Memory Alloys and Fused Deposition Modeling," International Conference on Intelligent Human Systems Integration, IHSI 2019: Intelligent Human Systems Integration 2019, Abstract Only, Feb. 7, 2019, 2 pp.
Extended Search Report from counterpart European Application No. 120206803.7, dated Mar. 9, 2021, 11 pp.

* cited by examiner

FUSED FILAMENT FABRICATION OF SHAPE MEMORY ALLOYS

This application claims the benefit of U.S. Provisional Application Ser. No. 62/935,415, titled, "FUSED FILAMENT FABRICATION OF SHAPE MEMORY ALLOYS", filed on Nov. 14, 2019, the entire content of which is incorporated herein by reference.

TECHNICAL FIELD

The disclosure relates to additive manufacturing techniques, in particular, to fused filament fabrication of alloy components.

BACKGROUND

Additive manufacturing generates three-dimensional structures through addition of material layer-by-layer or volume-by-volume to form the structure, rather than removing material from an existing volume to generate the three-dimensional structure. Additive manufacturing may be advantageous in many situations, such as rapid prototyping, forming components with complex three-dimensional structures, or the like. In some examples, additive manufacturing may include fused deposition modeling or fused filament fabrication, in which heated material, such as polymer, is extruded from a nozzle and cools to be added to the structure.

SUMMARY

In some examples, the disclosure describes a method that includes fused filament fabricating a fused filament fabricated component by delivering a softened filament to selected locations at or adjacent to a build surface. The softened filament may include a sacrificial binder and a powder including a shape memory alloy (SMA). The method also may include removing substantially all the sacrificial binder from the fused filament fabricated component to leave an unsintered component; and sintering the unsintered component to join particles of the SMA and form an SMA component.

In some examples, the disclosure describes a system that includes a filament delivery device; a build surface; and a computing device. The computing device may be configured to control the filament delivery device to deliver a softened filament to selected locations at or adjacent to the build surface. The softened filament may include a sacrificial binder and a powder including a shape memory alloy (SMA). The sacrificial binder may be configured to be substantially fully removed from the fused filament fabricated component to leave an unsintered component. The unsintered component is configured to be sintered to join particles of the SMA and form an SMA component.

In some examples, the disclosure describes a filament for fused filament deposition. The filament includes a sacrificial binder; and a shape memory alloy dispersed in the sacrificial binder.

The details of one or more examples are set forth in the accompanying drawings and the description below. Other features, objects, and advantages will be apparent from the description and drawings, and from the claims.

DETAILED DESCRIPTION

Figure 1:
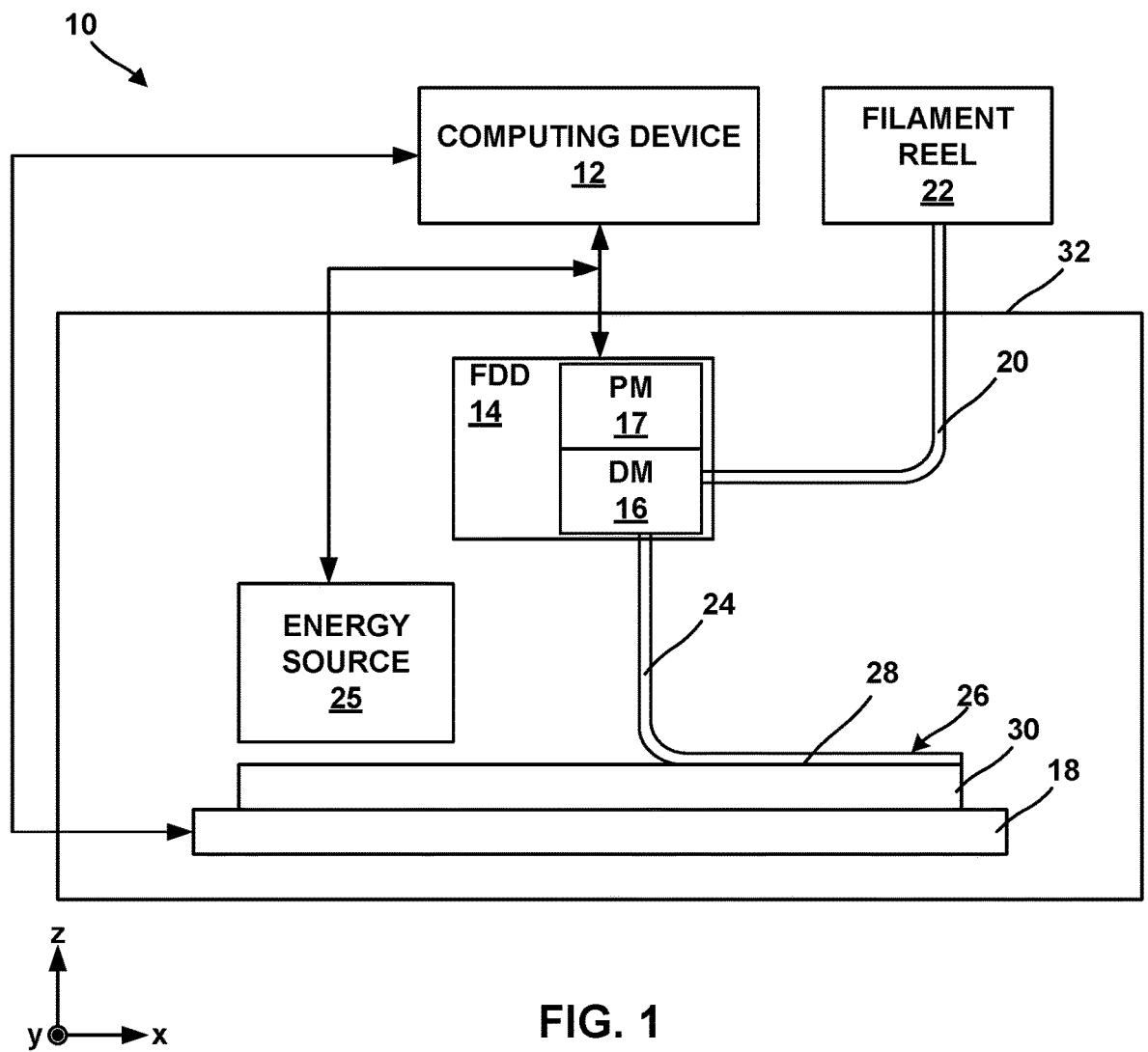
FIG. 1 is a conceptual block diagram illustrating an example system for forming a component using fused filament fabrication of a filament including a binder and a powder including a shape memory alloy.

The disclosure generally describes techniques for forming components using fused filament fabrication (FFF) of a filament that includes a sacrificial binder and a powder including a shape memory alloy (SMA). Additive manufacturing of metal or alloy components may present unique challenges, for example, compared to additive manufacturing of polymeric components. For example, while techniques, such as powder bed fusion (including direct metal laser sintering, electron beam melting, selective laser sintering, or the like), which use a directed energy beam to fuse and sinter material may be useful in additive manufacturing, some alloys may respond to energy beams in a manner that may not be conducive to localized melting or localized sintering. For example, melting may affect a grain structure of a shape memory alloy, which may impact its resulting mechanical and memory properties. Further, powder bed fusion may leave residual unfused or unsintered powder residue, for example, within channels or hollow internal passages of an additively manufactured component. Powder bed fusion of high temperature alloys may also result in components that may be prone to cracking due to localized melting and thermal gradients generated during the processing.

In some examples, a filament including a sacrificial binder and a powder including a SMA dispersed in the sacrificial binder may be deposited using FFF to form a fused filament fabricated component. The fused filament fabricated component may include a plurality of roads formed by the filament. After additively forming one or more layers of the component, or after forming the entire component, the sacrificial binder may be selectively removed or sacrificed from the layers or the component, for example, using heating, chemical dissolution, or the like. Sacrificing the binder from the layers or the component may leave substantially only the powder including the SMA in the layers or the component. The component may be further treated, for example, by sintering, to strengthen or densify the powder and form the additively manufactured component. By using the material including the sacrificial binder and the powder including the SMA, removing the sacrificial binder, and sintering the powder, high-melt temperature alloys may be used, residual (free) powder may be reduced, and/or crack propensity may be reduced due to the absence of melting. Further, microstructure of the fused filament fabricated component may be more carefully controlled by controlling microstructure of the powder and avoiding melting of the powder during processing. This may result in a component with a grain structure and chemical composition substantially similar to the microstructure of the powder particles, which may facilitate formation of SMA components with desired properties. Additionally, FFF may enable components with complex geometry to be formed, may allow dissimilar metals or alloys to be used with SMAs to incorporate other structural features, temperature-resistant materials, and/or corrosion resistant materials, or both.

FIG. 1 is a conceptual block diagram illustrating an example fused filament fabrication system 10 for performing fused filament fabrication to form an additively manufactured component including a sacrificial binder and a SMA by filament delivery. Additive manufacturing system 10 may include computing device 12, filament delivery device 14, enclosure 32, and stage 18.

Computing device 12 may include, for example, a desktop computer, a laptop computer, a workstation, a server, a mainframe, a cloud computing system, or the like. Computing device 12 is configured to control operation of additive manufacturing system 10, including, for example, filament delivery device 14, stage 18, or both. Computing device 12 may be communicatively coupled to filament delivery device 14, stage 18, or both using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, computing device 12 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Filament delivery device (FDD) 14 may include, for example, a delivery mechanism (DM) 16 for delivering a filament 20 to or near stage 18, and an optional positioning mechanism (PM) 18. Filament delivery device 14 may advance filament 20 from a filament reel 22 and heat filament 20 to above a softening or melting point of a component of filament 20 (e.g., a polymeric binder) to form a softened filament 24. Softened filament 24 is then extruded from delivery mechanism 16 and laid down in a road 26 on a major surface 28 of a substrate 30 (or, in subsequent layers, on a previously deposited road). The softened filament 34 cools and, in this way, is joined to other roads.

Substrate 30 may include a build plate on stage 18, or any suitable substrate defining a build surface. For example, substrate 30 may include a metal or glass plate defining a substantially planar surface. In other examples, substrate 30 may include surface features or a shaped (e.g., curved or curvilinear) surface on which the additively manufactured component is manufactured. In some examples, system 10 may not include a separate substrate 30, and filament delivery device 14 may deposit softened filament 24 on a build surface defined by stage 18, or on another component, or on layers of prior softened filament 24 or another material.

In some examples, filament delivery device 14 may, instead of receiving filament 20 from filament reel 22, include a chamber that holds a volume of a composition. The composition may be flowable, extrudable, or drawable from filament delivery device 14, for example, from delivery mechanism 16, in the form of softened filament 24 that may be deposited on or adjacent stage 18 or substrate 30. Softened filament 24 of the composition may be dried, cured, or otherwise solidified to ultimately form an additively manufactured component. In some examples, system 10 may include an energy source 25 configured to deliver energy to softened filament 24 to cure softened filament 24, for example, by photocuring or thermally curing the composition of softened filament 24.

Computing device 12 may be configured to control relative movement of filament delivery device 14 and/or stage 18 to control where filament delivery device 14 delivers softened filament 24. For example, stage 18 may be movable relative to filament delivery device 14, filament delivery device 14 may be movable relative to stage 18, or both. In some implementations, stage 18 may be translatable and/or rotatable along at least one axis to position substrate 30 relative to filament delivery device 14. For instance, stage 18 may be translatable along the z-axis shown in FIG. 1 relative to filament delivery device 14. Stage 18 may be configured to selectively position and restrain substrate 30 in place relative to stage 18 during manufacturing of the additively manufactured component.

Similarly, filament delivery device 14 may be translatable and/or rotatable along at least one axis to position filament delivery device 14 relative to stage 18. For example, filament delivery device 14 may be translatable in the x-y plane shown in FIG. 1, and/or may be rotatable in one or more rotational directions. Filament delivery device 14 may be translated using any suitable type of positioning mechanism 17, including, for example, linear motors, stepper motors, or the like.

Computing device 12 may be configured control movement and positioning of filament delivery device 14 relative to stage 18, and vice versa, to control the locations at which roads 26 are formed. Computing device 12 may be configured to control movement of filament delivery device 14, stage 18, or both, based on a computer aided manufacturing or computer aided design (CAM/CAD) file. For example, computing device 12 may be configured to control filament delivery device 14 (e.g., positioning mechanism 17) to trace a pattern or shape to form a layer including a plurality of roads on surface 38. Computing device 12 may be configured to control filament delivery device 14 or stage 18 to move substrate 30 away from filament delivery device 14, then control filament delivery device 14 to trace a second pattern or shape to form a second layer including a plurality of roads 26 on the first layer. Computing device 12 may be configured to control stage 18 and filament delivery device 14 in this manner to result in a plurality of layers, each layer including a traced shape or design. Together, the plurality of layers defines an additively manufactured component.

System 10 also includes an enclosure 32 that at least partially encloses filament delivery device 14 and stage 18, and optionally, energy source 25. In some examples, enclosure 32 substantially fully encloses delivery device 14 and stage 18, such that the environment within enclosure 32 may be controlled. In some examples, enclosure 32 includes or is coupled to a heat source configured to heat the interior environment of enclosure 32, a gas source and/or pump configured to control an atmospheric composition of the interior environment of enclosure 32, or the like. In this way, enclosure 32 may protect filament 20 and softened filament 24 during formation of the additively manufactured component, e.g., from unwanted chemical reactions that may change properties of the SMA and/or sacrifial binder.

Filament reel 22 holds a filament 20 having a selected composition. In some examples, system 10 includes a single filament reel 22 holding a single filament 20 having a single composition. In other examples, system 10 may include multiple filament reels 22, each filament reel holding a filament 20 having a selected composition. Regardless of the number of filaments 20 and filament reels 22, each filament may include a powder and a binder configured to bind the primary material in filament 20.

The powder may include a SMA. An SMA is an alloy that can recover its previous shape when heated above a transition temperature after relatively large deformations. An SMA may be a one-way SMA or a two-way SMA. A one-way SMA recovers its shape after being deformed at a relatively low temperature and heated above a transition temperature. The effect is not reversible, i.e., cooling the one-way SMA below a transition temperature does not cause the SMA to return to the deformed shape. A two-way SMA can transition between two different "remembered" shapes—a first shape below a low temperature transition temperature and a second shape above a high temperature transition temperature.

Due to this one-way or two-way shape memory, SMA components may be sued as temperature-sensitive actuators. For example, an SMA component may be trained or heat set into a first shape at a first temperature above the transition temperature. The SMA component then may be cooled below the transition temperature and deformed into a second shape. The SMA component may substantially remain in the second shape until heating above the transition temperature, at which time the SMA component may recover the first shape. In this way, the SMA component may transition from the second shape to the first shape upon being heating at or above the transition temperature. SMA components may act as actuators for components like variable stators, variable nozzles, variable exhaust mixers, variable tooling, or the like, which change shape at the transition temperature.

The powder may include any suitable SMA, e.g., any SMA with a suitable transition temperature and suitable mechanical properties for the use of the SMA component. Example SMAs include silver-cadmium alloys; gold-cadmium alloys; cobalt-nickel-aluminum alloys; co-nickel-gallium alloys; copper-aluminum-beryllium alloys that include one or more of zirconium, boron, chromium, or gadolinium; copper-aluminum-nickel alloys; copper-aluminum-nickel-hafnium alloys; copper-tin alloys; copper-zinc alloys; copper-zinc alloys that include one or more of silicon, aluminum, or tin; iron-manganese-silicon alloys; iron-platinum alloys, manganese-copper alloys; nickel-iron-gallium alloys; nickel-titanium alloys; nickel-titanium-hafnium alloys; nickel-titanium-palladium alloys; nickel-manganese-gallium alloys; nickel-niobium alloys; and the like. The atomic concentrations for the alloys may greatly affect the behavior of the alloy; concentration changes of 0.1 at. % for some alloys may change the transition temperature by as much as 10° C. Similarly, atomic concentrations outside certain ranges may cause the alloy to exhibit superelastic or elastic behavior rather than shape memory behavior.

In some examples, a filament may include another metal, alloy, and/or ceramic in addition to the SMA. In some examples, the additional material may include a high-performance metal or alloy for forming component used in mechanical systems, such as a steel (e.g., stainless steel) or other iron-based alloy, a nickel-based alloy, a cobalt-based alloy, a titanium-based alloy, or the like. In some examples, the additional material may include a nickel-based, iron-based, or titanium-based alloy that includes one or more alloying additions such as one or more of Mn, Mg, Cr, Si, Co, W, Ta, Al, Ti, Hf, Re, Mo, Ni, Fe, B, Nb, V, C, and Y. In some examples, the additional material may include a polycrystalline nickel-based superalloy or a polycrystalline cobalt-based superalloy, such as an alloy including NiCrAlY or CoNiCrAlY. For example, the additional material may include an alloy that includes 9 to 10.0 wt. % W, 9 to 10.0 wt. % Co, 8 to 8.5 wt. % Cr, 5.4 to 5.7 wt. % Al, about 3.0 wt. % Ta, about 1.0 wt. % Ti, about 0.7 wt. % Mo, about 0.5 wt. % Fe, about 0.015 wt. % B, and balance Ni, available under the trade designation MAR-M-247, from MetalTek International, Waukesha, Wis. In some examples, the additional material may include an alloy that includes 22.5 to 24.35 wt. % Cr, 9 to 11 wt. % Ni, 6.5 to 7.5 wt. % W, less than about 0.55 to 0.65 wt. % of C, 3 to 4 wt. % Ta, and balance Co, available under the trade designation MAR-M-509, from MetalTek International. In some examples, the additional material may include an alloy that includes 19 to 21 wt. % Cr, 9 to 11 wt. % Ni, 14 to 16 wt. % W, about 3 wt. % Fe, 1 to 2 wt. % Mn, and balance Co, available under the trade designation L605, from Rolled Alloys, Inc., Temperance, Mich. In some examples, the additional material may include a chemically modified version of MAR-M-247 that includes less than 0.3 wt. % C, between 0.05 and 4 wt. % Hf, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20. % Ta, and between 0.01 and 10 wt. % Ti. In some examples, the additional material may include a nickel based alloy available under the trade designation IN-738 or Inconel 738, or a version of that alloy, IN-738 LC, available from All Metals & Forge Group, Fairfield, N.J., or a chemically modified version of IN-738 that includes less than 0.3 wt. % C, between 0.05 and 7 wt. % Nb, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20 wt. % Ta, between 0.01 and 10 wt. % Ti, and a balance Ni. In some examples, the additional material may include an alloy that includes 5.5 to 6.5 wt. % Al, 13 to 15 wt. % Cr, less than 0.2 wt. % C, 2.5 to 5.5 wt. % Mo, Ti, Nb, Zr, Ta, B, and balance Ni, available under the trade designation IN-713 from MetalTek International, Waukesha, Wis.

In some example, the additional material may include a refractory metal or a refractory metal alloy, such as molybdenum or a molybdenum alloy (such as a titanium-zirconium-molybdenum or a molybdenum-tungsten alloy), tungsten or a tungsten alloy (such as a tungsten-rhenium alloy or an alloy of tungsten and nickel and iron or nickel and copper), niobium or a niobium alloy (such as a niobium-hafnium-titanium alloy), tantalum or a tantalum alloy, rhenium or a rhenium alloy, or combinations thereof.

In some examples, the additional material may include a ceramic, such as a nitride, carbide, or oxide, or carbon. Suitable ceramic materials include, for example, a silicon-containing ceramic, such as silica ($SiO_2$), silicon carbide (SiC), and/or silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or the like.

In some examples, the additional material may include a metal or alloy and a ceramic. For example, the additional material may include an oxide-dispersion strengthened (ODS) alloy. The ODS alloy may include at least one of a superalloy or a particle-dispersion strengthened alloy. ODS alloys are alloys strengthened through the inclusion of a fine dispersion of oxide particles. For example, an ODS alloy may include a high temperature metal matrix (e.g., any of the metals or alloys described above) that further include oxide nanoparticles, for example, yttria ($Y_2O_3$). Other example ODS alloys include nickel chromium ODS alloys, thoria-dispersion strengthened nickel and nickel chromium alloys, nickel aluminide and iron aluminide ODS alloys, iron chromium aluminide ODS alloys. Other strengthening particles may include alumina, hafnia, zirconia, beryllia, magnesia, titanium oxide, and carbides including silicon carbide, hafnium carbide, zirconium carbide, tungsten carbide, and titanium carbide.

Powders or particulates including ODS alloys may be formed by, for example, mixing a plurality of particles of metal(s) and oxide(s) forming the ODS alloy to form a mixture, optionally melting at least part of the mixture to form a melted mixture including oxide particles, and, if the mixture is melted, atomizing the melted mixture into the powdered form. Alternatively, the powdered form of the ODS alloy may be provided by hydrometallurgical processes, or any suitable technique for preparing an ODS alloy.

In some examples, ODS alloys may be characterized by the dispersion of fine oxide particles and by an elongated grain shape, which may enhance high temperature deformation behavior by inhibiting intergranular damage accumulation.

Filament 20 also includes a sacrificial binder. The sacrificial binder is configured to bind together the SMA and the optional additional material to form filament 20. The SMA and optional additional material may be dispersed in the binder, for example substantially uniformly dispersed in the sacrificial binder. The sacrificial binder may eventually be substantially removed, e.g., by heating or chemical removal prior sintering to form a sintered component that includes the SMA and optional additional material.

The sacrificial binder may include a polymer, such as a thermoplastic. Example thermoplastics include polyvinyl alcohol, polyolefins, polystyrene, acrylonitrile butadiene styrene, polylactic acid, thermoplastic polyurethanes, aliphatic polyamides, or the like, or combinations thereof. The sacrificial binder may be configured to be substantially fully removed by heating, chemical removal (e.g., using an acid in liquid or vapor form), or the like.

In some examples, the sacrificial binder may be in the form of a curable polymer precursor. The curable polymer precursor may be curable (for example, thermally curable or photocurable) to form the sacrificial binder. For example, the curable polymer precursor may be cured as softened filament 24 is extruded and/or after softened filament 28 is laid down in roads 26 including the SMA and optional additional material dispersed in the sacrificial binder, for example substantially uniformly dispersed in the sacrificial binder. The curable polymer precursor may include a precursor, for example, one or more monomers, oligomers, or non-cross-linked polymers suitable for forming the polymeric material of the sacrificial binder upon curing. Thus, in some examples, an energy source 25 may direct energy at a curable polymer precursor, for example, in the material, to selectively cure the curable polymer precursor to form roads 26 including the SMA, optional additional material, and the sacrificial binder. In other examples, the heat to which the composition is exposed to form softened filaments 24 may initiate the curing reaction, and no additional energy source is used.

Filament 20 includes a selected amount of binder and primary material so that the material in roads 26 may include more than about 80% by volume of the primary material, which may result in a substantially rigid component with reduced porosity being formed in response to removal of the binder. In some examples, filament 20 includes binder in an amount configured to cause the material to shrink by less than about 20 volume percent relative to an initial volume of the material in response to removing the binder. For example, filament 20 may include less than about 20% by volume of the binder.

In some examples, filament 20 includes at least one shrink-resistant agent. For example, the at least one shrink-resistant agent may include a ceramic, instead of, or in addition to, the oxide in any ODS present in the material(s).

Figure 2:
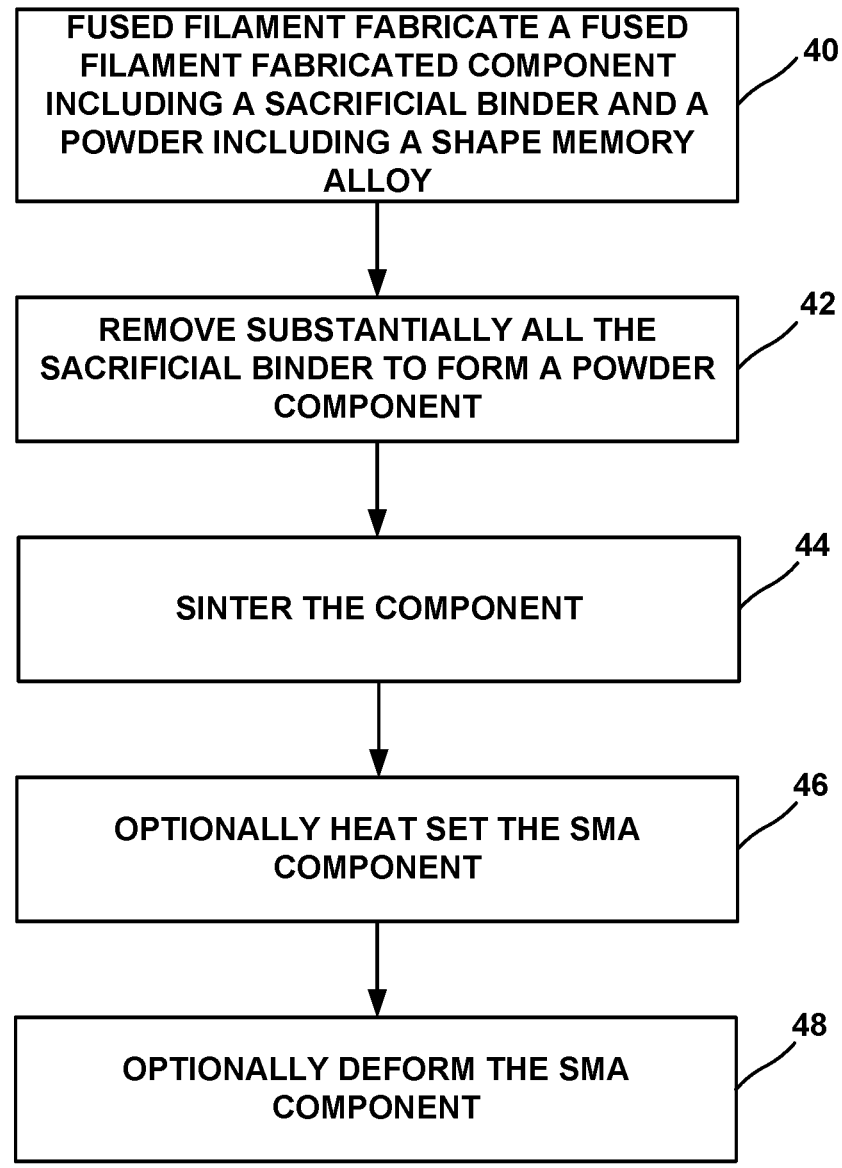
FIG. 2 is a flow diagram illustrating an example technique for forming a component using fused filament fabrication of a filament including a binder and a powder including a shape memory alloy.

An example technique that may be implemented by system 10 will be described with concurrent reference to FIG. 2. FIG. 2 is a flow diagram illustrating an example technique for forming a fused filament fabricated component using a filament that includes a SMA and a sacrificial binder. Although the technique of FIG. 2 is described with respect to system 10 of FIG. 1, in other examples, the technique of FIG. 2 may be performed by other systems, such a system including fewer or more components than those illustrated in FIG. 1. Similarly, system 10 may be used to performed other additive manufacturing techniques.

The technique of FIG. 2 includes fused filament fabricating a fused filament fabricated component that includes a binder and a powder including a SMA (40). Fused filament fabricating the fused filament fabricated component (40) may include positioning substrate 30 including surface 28 adjacent to a build position, e.g., on stage 18. In some examples, system 10 may not include a separate substrate 30, and the technique of FIG. 2 may include positioning a build surface defined by stage 18, or by another component, or layers of prior softened filament 24 or another material.

Fused filament fabricating the fused filament fabricated component (40) also may include forming a road 26 of material using fused filament fabrication. Computing device 12 may cause filament delivery device 14 to deposit softened filament 24 in one or more roads 26 to ultimately form the fused filament fabricated component. A plurality of roads 26 defining a common plane may define a layer of material. Thus, successive roads 26 may define a series of layers, for example, parallel layers, and the series of layers may eventually define the additively manufactured component.

Fused filament fabricating the fused filament fabricated component (40) additionally may include forming, on roads 26 of material, at least one additional layer of material to form the fused filament fabricated component. For example, computing device 12 may control movement and positioning of filament delivery device 14 relative to stage 18, and vice versa, to control the locations at which roads 26 are formed. Computing device 12 may control movement of filament delivery device 14, stage 18, or both, based on a computer aided manufacturing or computer aided design (CAM/CAD) file. For example, computing device 12 may control filament delivery device 14 to trace a pattern or shape to form a layer including a plurality of roads 26 on surface 28. Computing device 12 may control filament delivery device 14 or stage 18 to move substrate 30 away from filament delivery device 14, then control filament delivery device 14 to trace a second pattern or shape to form a second layer including a plurality of roads on the previously deposited layer. Computing device 12 may control stage 18 and filament delivery device 14 in this manner to result in the plurality of layers, each layer including a traced shape or design. Together, the plurality of layers defines a fused filament fabricated component (40).

The technique of FIG. 2 then includes removing substantially all the sacrificial binder from the fused filament fabricated component (42). As described above, the sacrificial binder may be removed using, for example, heat, a chemical (e.g., an acid in liquid or vapor form), or the like.

The technique of FIG. 2 also includes, after sacrificing the binder (42), sintering the fused filament fabricated component to form a sintered component including the SMA (44). The sintering may include a thermal treatment, for example, one or more predetermined cycles of exposure to predetermined temperatures for predetermined times. In some examples, energy source 25 may deliver energy to cause sintering. In other examples, the fused filament fabricated component may be placed in a furnace to heat the fused filament fabricated component and cause sintering.

In some examples, the sintering (44) may promote bonding of particles of SMA to each other to strengthen the fused filament fabricated component including substantially only the SMA after the binder is sacrificed. Sintering may not melt the SMA, thus leaving the microstructure of the SMA substantially intact. This may facilitate forming SMA components with selected microstructures, such as substantially anisotropic microstructures, compared to processes that include melting the SMA. The sintering (44) may also densify an interior or a surface region of the SMA component, for example, by promoting compaction and reducing porosity of the SMA. In some examples, the steps of removing the sacrificial binder (42) and sintering the component (44) may be combined in a single heating step or series of heating steps, e.g., within a furnace.

The technique of FIG. 2 also optionally includes heat setting the SMA component (46). Heat setting the SMA component (46) includes shaping the SMA component and heating the SMA component at a temperature and for a time to cause the SMA component to "remember" the heat-set shape. The temperature at which the SMA component is heat set, the time for which the SMA component is heat set, and the composition of the SMA component affect the transition temperature of the resulting SMA component (e.g., the temperature at or above which the SMA component transitions back to its heat-set shape after being deformed). As such, the temperature and time for the heat set may be selected to result in a selected transition temperature. In some examples, the heat set (46) may not be performed, as the sintering (44) may heat set the SMA component.

The technique of FIG. 2 also optionally includes deforming the SMA component into a deformed configuration (48). The deformed configuration may include any suitable configuration in which the SMA component is to be during initial use. For example, for a heat-activated actuator, the deformed configuration may be the configuration in which the system is un-actuated. The deformed configuration defines the shape of the SMA component at temperatures below the transition temperature, prior to heating of the SMA component to a temperature at or above the transition temperature.

Figure 3:
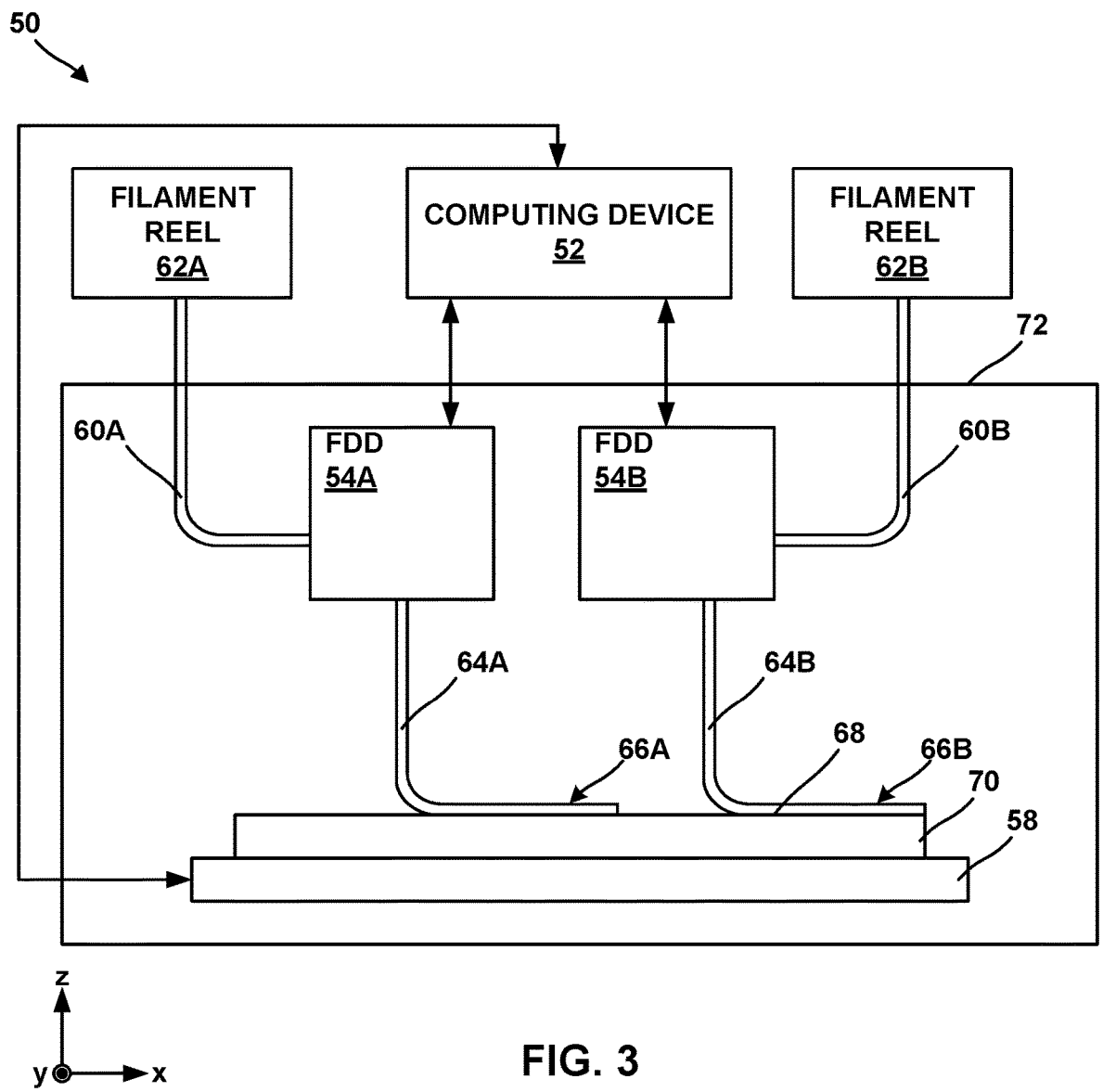
FIG. 3 is a conceptual block diagram illustrating an example system for forming an additively manufactured component by fused filament fabrication of a first filament including a shape memory alloy and a sacrificial binder and a second filament including the sacrificial binder and a primary material.

In some examples, a component may include one or more regions of SMA and one or more regions of other material. Such a component may be formed using a FFF process using at least two filaments. FIG. 3 is a conceptual block diagram illustrating an example system 50 for forming an additively manufactured component by fused filament fabrication of a first filament 60A including a SMA and a sacrificial binder and a second filament 60B including the sacrificial binder and a primary material.

System 50 may be similar in many respects to system 10 of FIG. 1. For example, system 50 may include computing device 52, filament delivery devices 54A and 54B (collectively, "filament delivery devices 54"), filament reels 62A and 62B (collectively, "filament reels 62"), stage 58, substrate 70, and enclosure 72. Each of these components may be similar to or substantially the same as the corresponding components illustrated in FIG. 1.

Unlike system 10 of FIG. 1, system 50 includes two filaments reels 62 and two filament delivery devices 54. First filament reel 62A holds a first filament 60A that is delivered to first filament delivery device 54A. First filament 60A may be similar or substantially the same as filament 20 illustrated in FIG. 1, i.e., first filament 60A may include a SMA and a sacrificial binder.

System 50 also includes a second filament reel 62B that holds a second filament 60B that is delivered to second filament delivery device 54B. Second filament 60B also includes the sacrificial binder, but a primary material that is different than the SMA in first filament 60A. In some examples, the primary material in second filament 60B is another SMA, e.g., another SMA that has a different composition than the SMA in first filament 60A, such that a component formed from first filament 60A and second filament 60B may include different regions that exhibit different shape memory transition temperatures.

In some examples, the primary material includes another metal or alloy, a refractory metal or refractory alloy, a ceramic, or an ODS, as described above with reference to the additional material in FIG. 1. The sacrificial binder in second filament 60B may include any of the sacrificial binders described herein. The sacrificial binder in second filament 60B may the same as or different from the sacrificial binder in first filament 60A.

Figure 4:
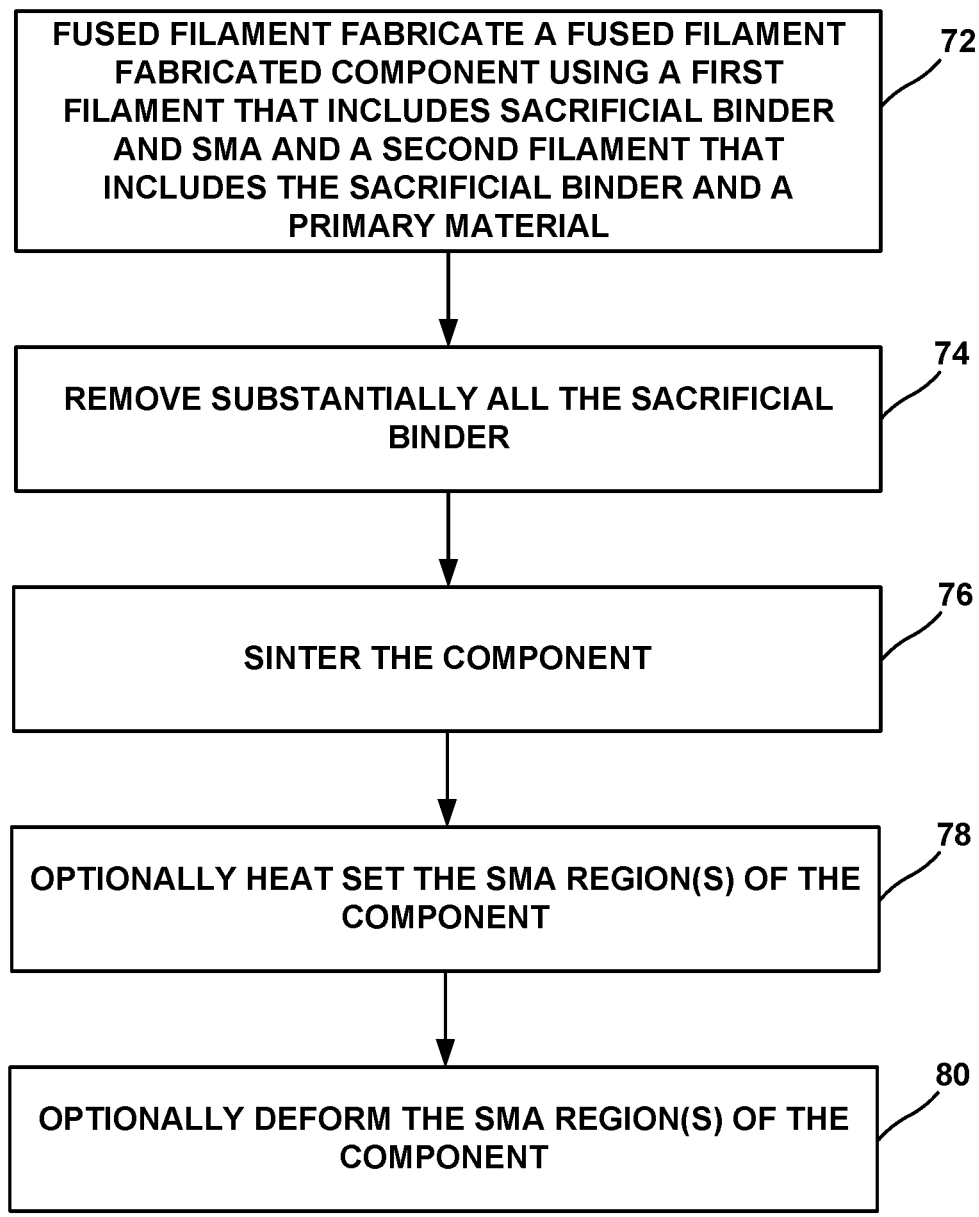
FIG. 4 is a flow diagram illustrating an example technique for forming a fused filament fabricated component using a first filament that includes a shape memory alloy and a sacrificial binder and a second filament that includes a primary material and the sacrificial binder.

FIG. 4 is a flow diagram illustrating an example technique for forming a fused filament fabricated component using a first filament that includes a SMA and a sacrificial binder and a second filament that includes a primary material and the sacrificial binder. Although the technique of FIG. 4 is described with respect to system 50 of FIG. 3, in other examples, the technique of FIG. 4 may be performed by other systems, such a system including fewer or more components than those illustrated in FIG. 3. Similarly, system 50 may be used to performed other additive manufacturing techniques.

The technique of FIG. 4 includes fused filament fabricating a fused filament fabricated component using a first filament 60A that includes a SMA and a sacrificial binder and a second filament 60B that includes a primary material and the sacrificial binder (72). Fused filament fabricating the fused filament fabricated component (72) may include positioning substrate 70 including surface 68 adjacent to a build position, e.g., on stage 58. In some examples, system 50 may not include a separate substrate 70, and the technique of FIG. 4 may include positioning a build surface defined by stage 58, or by another component, or layers of prior softened filament 64A and 64B or another material.

Fused filament fabricating the fused filament fabricated component (72) also may include forming at least one first road 66A of the first filament using fused filament fabrication. Computing device 52 may cause first filament delivery device 54A to deposit first softened filament 64A in one or more first roads 66A at selected locations to ultimately form part of the fused filament fabricated component. Computing device 52 also may cause second filament delivery device 54B to deposit second softened filament 64B in one or more second roads 66B at other selected locations to ultimately form part of the fused filament fabricated component. The selected locations for the first softened filament 64A and second softened filament 64B may be selected based on locations at which the SMA and the primary material are desired, e.g., computing device 52 may control first filament delivery device 54A to deliver first softened filament 64A to locations at which the SMA is desired and control second filament delivery device 54B to deliver second softened filament 64B to locations at which the primary is desired. The locations at which computing device 52 causes the first softened filament 64A and second softened filament 64B to be delivered may be defined by a build file. A plurality of roads (of first filament 60A and/or second filament 60B) defining a common plane may define a layer of material. Thus, successive roads 66 may define a series of layers, for example, parallel layers, and the series of layers may eventually define the additively manufactured component.

Fused filament fabricating the fused filament fabricated component (72) additionally may include forming, on roads 66 of material, at least one additional layer of material (e.g., first filament 60A, second filament 60B, or both) to form the fused filament fabricated component.

Once computing device 52 has controlled first filament delivery device 54A and second filament delivery device 54B to deposit first filament 60A and second filament 60B at all selected locations, the fused filament fabricated component may be complete. The technique of FIG. 4 then includes removing substantially all of the sacrificial binder (74). As described above, the sacrificial binder may be removed using, for example, heat, a chemical (e.g., an acid), or the like.

Once the sacrificial binder has been substantially fully removed, the fused filament fabricated component may be heated to sinter the SMA and the primary material (76). This step may be similar to or substantially the same as step (44) described with reference to FIG. 2.

The technique of FIG. 4 also optionally includes heat setting the SMA regions(s) of the component (78) and optionally deforming the SMA region(s) of the component into a deformed configuration (80). These steps may be similar to or substantially the same as steps (46) and (48), respectively, described with reference to FIG. 2.

SMA components may act as actuators for components like variable stators, variable nozzles, variable exhaust mixers, variable tooling, or the like, which change shape at the transition temperature. For example, a variable stator may be configured to circumferentially surround a rotating component, such as a compressor or turbine rotor of a gas turbine engine. The compressor or turbine rotor may include a plurality of blades. As the gas turbine engine operates, the gas turbine blades and stator experience changes in temperature, e.g., generally heat up during operation and cool upon the engine being turned off. As the gas turbine blade heats, thermal expansion causes the gas turbine blade to lengthen towards the stator. Conversely, as the gas turbine blade cools, thermal expansion causes the gas turbine blade to contract away from the stator. Any gap between a tip of the gas turbine blade and the stator allows gas flow through the gap, reducing efficiency of the gas turbine engine. Thus, a component that causes a change in position of the stator as a function of temperature may reduce a gap between the stator and the rotating gas turbine blades, increasing efficiency of the gas turbine engine. The SMA component may be positioned between a support and a stator section such that the SMA component can move the stator section radially inward toward the blade and/or outward from the blade. As an example, the SMA component may have a cold, deformed shape that positions the stator section more radially inward and a hot, "remembered" shape that positions the stator section more radially outward.

Variable nozzles may be used to control an amount of fluid flow through an orifice in response to a change in operating conditions. For example, a variable nozzle may include a SMA component that causes the orifice to be larger when cool and smaller when above the transition temperature. This may reduce fluid flow through the orifice at higher temperatures, which may be used to, for example, restrict fluid flow at cruising conditions while not requiring active fluid flow control systems.

Similarly, variable exhaust mixers and variable tooling may include a SMA component that changes shape when heated at or above a transition temperature, resulting in changes in geometry based on temperature. For tooling, the change in shape may result in a change in clamping force or positioning. By using FFF to form any of these variable components, complex shapes may be realized with careful control of composition and microstructure.

Clause 1. A method comprising: fused filament fabricating a fused filament fabricated component by delivering a softened filament to selected locations at or adjacent to a build surface, wherein the softened filament comprises a sacrificial binder and a powder including a shape memory alloy (SMA); removing substantially all the sacrificial binder from the fused filament fabricated component to leave an unsintered component; and sintering the unsintered component to join particles of the SMA and form an SMA component.

Clause 2. The method of clause 1, wherein the SMA comprises at least one of a one-way SMA or a two-way SMA.

Clause 3. The method of clause 1 or 2, wherein the SMA comprises at least one of a silver-cadmium alloy; a gold-cadmium alloy; a cobalt-nickel-aluminum alloy; a cobalt-nickel-gallium alloy; a copper-aluminum-beryllium alloy that includes one or more of zirconium, boron, chromium, or gadolinium; a copper-aluminum-nickel alloy; a copper-aluminum-nickel-hafnium alloy; a copper-tin alloys; a copper-zinc alloy; a copper-zinc alloy that include one or more of silicon, aluminum, or tin; an iron-manganese-silicon alloy; an iron-platinum alloy, a manganese-copper alloy; a nickel-iron-gallium alloy; a nickel-titanium alloy; a nickel-titanium-hafnium alloy; a nickel-titanium-palladium alloy; a nickel-manganese-gallium alloy; or a nickel-niobium alloy.

Clause 4. The method of any one of clauses 1 to 3, further comprising heat setting the SMA component.

Clause 5. The method of any one of clauses 1 to 4, further comprising deforming the SMA component to a deformed shape.

Clause 6. The method of any one of clauses 1 to 5, wherein the softened filament comprises a first softened filament, and wherein the method further comprises: delivering a second softened filament to other selected locations at or adjacent to the build surface, wherein the second softened filament comprises the sacrificial binder and a primary material.

Clause 7. The method of clause 6, wherein the primary material comprises at least one of: a shape memory alloy; a metal; an alloy; a refractory metal; a refractory alloy; a ceramic; or an oxide-dispersion strengthened alloy.

Clause 8. The method of any one of clauses 1 to 7, wherein the SMA component comprises a variable stator, a variable nozzle, a variable exhaust mixer, or a variable tooling.

Clause 9. The method of any one of clauses 1 to 8, wherein sintering the unsintered component leaves a microstructure of the SMA substantially unchanged.

Clause 10. A system comprising: a filament delivery device; a build surface; and a computing device, wherein the computing device is configured to: control the filament delivery device to deliver a softened filament to selected locations at or adjacent to the build surface, wherein the softened filament comprises a sacrificial binder and a powder including a shape memory alloy (SMA), wherein the sacrificial binder is configured to be substantially fully removed from the fused filament fabricated component to leave an unsintered component, and wherein the unsintered component is configured to be sintered to join particles of the SMA and form an SMA component.

Clause 11. The system of clause 10, wherein the SMA comprises at least one of a one-way SMA or a two-way SMA.

Clause 12. The system of clause 10 or 11, wherein the SMA comprises at least one of a silver-cadmium alloy; a gold-cadmium alloy; a cobalt-nickel-aluminum alloy; a cobalt-nickel-gallium alloy; a copper-aluminum-beryllium alloy that includes one or more of zirconium, boron, chromium, or gadolinium; a copper-aluminum-nickel alloy; a copper-aluminum-nickel-hafnium alloy; a copper-tin alloys; a copper-zinc alloy; a copper-zinc alloy that include one or more of silicon, aluminum, or tin; an iron-manganese-silicon alloy; an iron-platinum alloy, a manganese-copper alloy; a nickel-iron-gallium alloy; a nickel-titanium alloy; a nickel-titanium-hafnium alloy; a nickel-titanium-palladium alloy; a nickel-manganese-gallium alloy; or a nickel-niobium alloy.

Clause 13. The system of any one of clauses 10 to 12, wherein the softened filament comprises a first softened filament and the filament delivery device comprises a first filament delivery device, and wherein the computing device is further configured to: cause a second filament delivery device to deliver a second softened filament to other selected locations at or adjacent to the build surface, wherein the second softened filament comprises the sacrificial binder and a primary material.

Clause 14. The system of clause 13, wherein the primary material comprises at least one of: a shape memory alloy; a metal; an alloy; a refractory metal; a refractory alloy; a ceramic; or an oxide-dispersion strengthened alloy.

Clause 15. The system of any one of clauses 10 to 14, wherein the SMA component comprises a variable stator, a variable nozzle, a variable exhaust mixer, or a variable tooling.

Clause 16. A filament for fused filament deposition, the filament comprising: a sacrificial binder; and a shape memory alloy dispersed in the sacrificial binder.

Clause 17. The filament of clause 16, wherein the SMA comprises at least one of a one-way SMA or a two-way SMA.

Clause 18. The filament of clause 16 or 17, wherein the SMA comprises at least one of a silver-cadmium alloy; a gold-cadmium alloy; a cobalt-nickel-aluminum alloy; a cobalt-nickel-gallium alloy; a copper-aluminum-beryllium alloy that includes one or more of zirconium, boron, chromium, or gadolinium; a copper-aluminum-nickel alloy; a copper-aluminum-nickel-hafnium alloy; a copper-tin alloys; a copper-zinc alloy; a copper-zinc alloy that include one or more of silicon, aluminum, or tin; an iron-manganese-silicon alloy; an iron-platinum alloy, a manganese-copper alloy; a nickel-iron-gallium alloy; a nickel-titanium alloy; a nickel-titanium-hafnium alloy; a nickel-titanium-palladium alloy; a nickel-manganese-gallium alloy; or a nickel-niobium alloy.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   fused filament fabricating a fused filament fabricated component by delivering a first softened filament to selected locations at or adjacent to a build surface, wherein the first softened filament comprises a sacrificial binder and a powder including a shape memory alloy (SMA);
   delivering a second softened filament to other selected locations at or adjacent to the build surface, wherein the second softened filament comprises the sacrificial binder and a primary material;

removing substantially all the sacrificial binder from the fused filament fabricated component to leave an unsintered component; and sintering the unsintered component to join particles of the SMA and the primary material and form an SMA and primary material component, wherein the SMA and primary material component includes different regions that exhibit different shape memory transition temperatures.

2. The method of claim 1, wherein the SMA comprises at least one of a one-way SMA or a two-way SMA.

3. The method of claim 1, wherein the SMA comprises at least one of a silver-cadmium alloy; a gold-cadmium alloy; a cobalt-nickel-aluminum alloy; a cobalt-nickel-gallium alloy; a copper-aluminum-beryllium alloy that includes one or more of zirconium, boron, chromium, or gadolinium; a copper-aluminum-nickel alloy; a copper-aluminum-nickel-hafnium alloy; a copper-tin alloys; a copper-zinc alloy; a copper-zinc alloy that include one or more of silicon, aluminum, or tin; an iron-manganese-silicon alloy; an iron-platinum alloy, a manganese-copper alloy; a nickel-iron-gallium alloy; a nickel-titanium alloy; a nickel-titanium-hafnium alloy; a nickel-titanium-palladium alloy; a nickel-manganese-gallium alloy; or a nickel-niobium alloy.

4. The method of claim 1, further comprising heat setting the SMA component.

5. The method of claim 1, further comprising deforming the SMA component to a deformed shape.

6. The method of claim 1, wherein the primary material comprises at least one of: a shape memory alloy; a metal; an alloy; a refractory metal; a refractory alloy; a ceramic; or an oxide-dispersion strengthened alloy.

7. The method of claim 1, wherein the SMA component comprises a variable stator, a variable nozzle, a variable exhaust mixer, or a variable tooling.

8. The method of claim 1, wherein sintering the unsintered component leaves a microstructure of the SMA substantially unchanged.

* * * * *